United States Patent [19]

Paglia

[11] Patent Number: 5,327,673
[45] Date of Patent: Jul. 12, 1994

[54] MAGNETIC AIR TIGHT ANIMAL TRAP ASSEMBLY

[76] Inventor: John Paglia, 1680 Narcissa, Blue Bell, Pa. 19422-2505

[21] Appl. No.: 68,787

[22] Filed: Jun. 1, 1993

[51] Int. Cl.⁵ .......................................... A01M 23/02
[52] U.S. Cl. ........................................................ 43/61
[58] Field of Search ........................... 43/61, 60, 65, 67

[56] References Cited

U.S. PATENT DOCUMENTS

| | | | |
|---|---|---|---|
| 3,733,735 | 5/1973 | Hirsch | 43/61 |
| 4,232,472 | 11/1980 | Muelling | 43/61 |
| 4,468,883 | 9/1984 | Williams | 43/61 |
| 4,550,523 | 11/1985 | Spiller | 43/61 |
| 4,578,892 | 4/1986 | Melton | 43/61 |
| 4,787,170 | 11/1988 | Kingsburg et al. | 43/61 |
| 4,831,766 | 5/1989 | Giglietti | 43/61 |
| 4,984,382 | 1/1991 | Yost | 43/61 |
| 5,067,271 | 11/1991 | Henning | 43/61 |

Primary Examiner—P. Austin Bradley
Assistant Examiner—Chuck Y. Mah

[57] ABSTRACT

A magnetic air tight animal trap assembly capable of converting an enclosure into an animal entrapment vehicle. The assembly is disposable or reusable offering optional methods for dealing with the animal. If the enclosure is air tight, as the assembly is, the animal will suffocate. If the enclosure is not sealed the animal will remain entrapped until released. The air tight assembly is composed of a flat, flexible, magnetic material. This material is available in thin sheets and is easily cut to any desired shape. The magnetic door and the magnetic door adapter overlap and provide an air tight seal when closed. The magnetic door is hinged to the magnetic door adapter and is held open by its magnetic attraction to a door support rod. The magnetic door adapter is capable of mounting the magnetic air tight animal trap assembly to any enclosure with an opening sized to the adapter by either magnetic or adhesive means.

20 Claims, 1 Drawing Sheet

MAGNETIC AIR TIGHT ANIMAL TRAP ASSEMBLY

BACKGROUND

1. Field of Invention

This invention relates generally to animal traps, and more specifically to a magnetic, air tight, trap assembly capable of converting any enclosure into an animal entrapment vehicle. If the enclosure is air tight then an asphyxiating animal trap is created.

2. Discussion of Prior Art

The prior art relating to animal traps, especially device that catch rodents, are numerous and varied, but none have adequately addressed the problems presented by our modern and sophisticated society. The most popular and widely used trap is the well-known spring mouse trap, it is cheap enough to be disposable, and very effective; unfortunately the dead mouse must be dealt with, it must be seen. In our refined environment many people find it offensive to view a mouse that has been killed, incapacitated, or mutilated by the spring trap.

Prior art, Williams, U.S. Pat. No. 4,468,883, offers a magnetically sealable enclosure that dispatches and hides it's catch, but in order to accomplish this air tight trap a number of precision parts are needed. The present invention is air tight while employing only the most basic parts and entrapment methodology.

Another prior art, Spiller, U.S. Pat. No. 4,550,523, is extremely simple, and with only two parts very economical to manufacture. Unfortunately as it is presently being marketed it is not air tight, consequently the trap with the mouse alive inside must be dealt with. This trap's design does not appear to be conducive to an air tight seal. The type of individual interested in purchasing a mouse trap that effectively eliminates the mental and physical problems associated with dispatching a mouse would not want the anguish of disposing of a live mouse.

The present invention, with its sealed air holes, allows the user three methods of rodent disposal. First, simply throw the trap and the dead, suffocated mouse away. Second, dispose of the dead, suffocated mouse, and reuse the trap. Third, with the optional sealed air holes opened, simply let the live mouse free outside.

The present invention presents an animal trap that is humane to use, economical to manufacture, and gives optional methods of dealing with the trapped rodent. The invention can asphyxiate a mouse by magnetically sealing any air tight enclosure where it is employed. The invention and the mouse can be disposed of without ever having to see the victim of its efficiency. The invention is of simple design with only one moving part.

Objects and Advantages

It is the object of this invention to provide a magnetic air tight animal trap assembly that is humane to use, eliminating as much as possible any suffering to the animal caught.

It is another object of this invention to alleviate the mental and physical hardship associated with dispatching a mouse in our sophisticated society.

It is another object of this invention to provide a simple, efficient, economical, and convenient magnetic air tight animal trap.

With the above and other objects in view, the present invention consists of the combination and arrangement of parts herein more fully described, and illustrated in the accompanying drawings, and more particularly, that changes may be made in the form, size, proportions, and minor details of construction without departing from the spirit or sacrificing any of the advantages of the invention.

DESCRIPTION AND OPERATION

Figure 1:
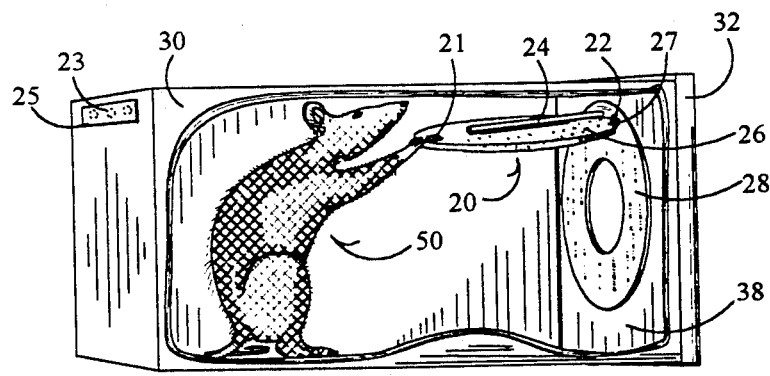
FIG. 1 is a partial sectioned, perspective, elevation view of the magnetic trap assembly in combination with a rodent and a rectangular enclosure.

Now with particular reference to the drawings,

In FIG. 1 the rectangular enclosure 30 contains a rodent 50 reaching for the bait 21. The magnetic trap assembly 20 is attached to the inside flat surface 38 of the lid 32 by the magnetic door adapter 28. The magnetic trap assembly 20 can be attached to any inside flat surface 38, not only the lid's 32, but the lid's 32 inside flat surface 38 would be the most convenient to use. The lid 32 and inside flat surface 38 are composed of a ferrous metal such as tin. The magnetic door adapter 28 is composed of a flexible, rubberized, magnetic material. This material is commercially available and used in a variety of applications. Some common uses are magnetic business cards and advertising signs attached magnetically to the side of vehicles. This magnetic material can be purchased in sheets of any desire thickness, 1/16" or ⅛" thickness being most appropriate for small rodents. The material is easily die cut to any desired shape. The magnetic door adapter 28 and the magnetic door 26 are both cut from this material. Because this material is flexible, pliable, flat, and magnetic, it is the ideal substance for making an air tight seal. Simply by laying two pieces together a near perfect seal is created, as is the case with the overlapped surfaces of the magnetic door adapter 28 and the magnetic door 26. Although the magnetic door adapter 28 and the magnetic door 26 in the preferred embodiment are made of this rubberized magnetic material they could be made of magnetized metal. The operation would be the same, but an air tight seal would be more difficult to obtain. Precise tolerances would have to be maintained due the tendency of thin metal to distort, and have slight edges, when stamped. The preferred embodiment of the magnetic door 26 and magnetic door adapter 28 is shown as round, but the door 26 and the door adapter 28 could be square, or any other shape, as long as an overlapped surface is maintained.

An air tight seal is extremely important to this type of asphyxiating trap design because if there is the slightest leak the mouse will survive, although it may be in an unconscious state. This could result in an unacceptable situation. For instance, if the user of the trap assumes the rodent is dead and discards the rodent in the trash with the intent of reusing the trap, it is possible the rodent may revive and cause an unnecessary disturbance. This could cause alarm and possible injury due to overreaction by the individuals involved.

To make air tight trap with the magnetic trap assembly 20 all that is necessary is an air tight enclosure with a lid, such as a plastic box. Simply cut a hole in an inside flat surface 38 the same size as the opening in the magnetic door adapter 28 and attach the adapter 28 to an inside flat surface 38. Because of the unique characteristics of the magnetic material used for the magnetic door 26 and magnetic door adapter 28 this is all that is necessary to produce an air tight seal. Other prior art trap designs which claim to be air tight require very precise part manufacture and assembly. Even then the ability of the these traps to be absolutely air tight is questionable since even the slightest leak will allow a rodent to survive indefinitely.

If the rodent 50 is to be released and not asphyxiated then the optional air holes 23 can be opened by removing the piece of tape 25. This will allow the rodent 50 to survive until released.

Figures 4A, 4B, 4C, 4D, 4E:
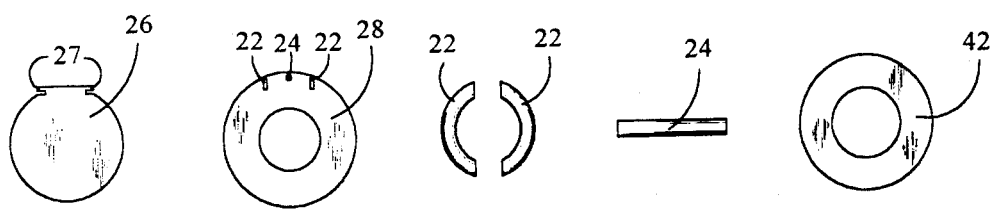
FIGS. 4A-4E are top plan views of the unassembled parts of the magnetic trap assembly.

If an inside flat surface 38 is made of a non-magnetic material, such as plastic, then all that is necessary to attach the magnetic trap assembly to an inside flat surface 38 is a piece of double faced tape 42 sized to the magnetic door adapter 28, as shown in FIG. 4. Any type of adhesive means, such as glue, can be used to create a sealed attachment of the adapter 28 to an inside flat surface 38.

The bait 21 can be any type of sticky food commonly found in the kitchen. Peanut butter or margarine are particularly well suited since both emit prevalent odors and are capable of adhering easily to most surfaces, including the magnetic door 26.

The rodent 50 enters the air tight enclosure 30 in search of the odor emitting food. Since the bait 21 is overhead on top of the magnetic door 26 the rodent 50 must enter completely and then turn around in order to reach the bait 21. The magnetic door 26 is held open by its magnetic attraction to the metal door support rod 24. As the rodent 50 touches the bait 21 downward pressure is exerted on the magnetic door 26. When the pressure is great enough the magnetic door 26 will be dislodged from the ferrous door support rod 24, and because of gravity, will pivot on its hinges 22 downward. The weight and magnetic attraction of the door 26 will bring it in contact with the magnetic door adapter 28. An air tight seal is ensured since the overlapped surface of the magnetic door adapter 28 and the magnetic door 26 is of sufficient width to guarantee this.

The degree of downward pressure from the rodent 50 that is necessary to dislodge the magnetic door is dependent upon the following adjustable factors; one, the area of the door support rod 24 that is in contact with the magnetic door 26; two, the magnetic strength of the flexible magnetic material; three, the weight of magnetic door 26; and four, the weight of the bait. These factors can be manipulated to obtain the degree of sensitivity desired. For instance the door support rod 24, shown as round, could be flat or triangular in shape, both shapes increase contact area with the door 26 thus increasing the pressure needed to dislodge the door 26. The magnetic strength of the door could be increased or decreased during manufacture. The bait 21 could be a solid substance impregnated with an odor and permanently attached to the door 26. Some rodent traps presently on the market employ such a bait 21. Another option would be for the top of the door 26 to be coated with a very thin covering of an odoriferous rodent attractant. These types of manufactured baits 21 would be preferable to food substances applied to the door 26 by the user of the magnetic trap assembly 20 for several reasons. The weight of the baits 21 would be controlled thus guaranteeing optimal sensitivity of the trap. Also the trap becomes even more user friendly since nothing is required of the user other than opening the door.

Figure 2:
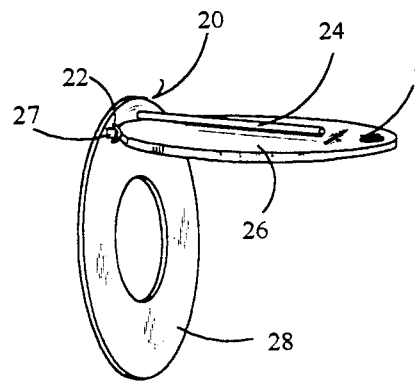
FIG. 2 is a perspective, elevation view of the magnetic trap assembly with the magnetic door open.
Figure 3:
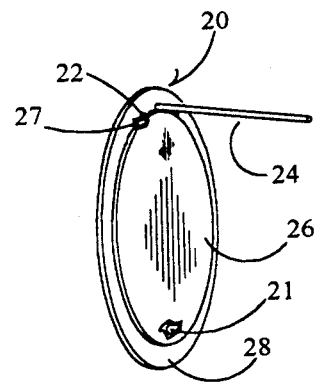
FIG. 3 is a perspective, elevation view of the magnetic trap assembly with the magnetic door closed.

FIG. 2 shows the magnetic trap assembly 20 in the open position, and FIG. 3 shows the assembly 20 in the closed, sealed position.

FIGS. 4A-4E show the component parts of the trap assembly 20, along with a die cut piece of double face tape 42 that is used to attach the magnetic trap assembly 20 to a non-magnetic inside flat surface 38. The hinge members 22 are simple, being nothing more than two round rods bent into half circles. They can be attached to the magnetic door assembly 28, if it is used, with glue or epoxy. If the door assembly is not used, as show in FIG. 5 they can be soldered or attached adhesively to the inside flat surface 38 of the round lid 32A. The magnetic door 26 is die cut such that the top edge surface has projections 27 that are sized to be received by the hinge members 22. The type of hinge members 22 used and the design of the magnetic door's 26 projections 27 are very simple and any number of different shaped hinge members 22 and projections 27 would be acceptable. Another advantage of the preferred embodiment's pliant magnetic door 26 is its ability to flex, because of this the hinge members 22 can be permanently attached to the adapter 28 or, as shown in FIG. 5, the round lid's 32A inner surface 38 first, and then the pliable door can be flexed enough to insert the projections 27 into the receiving hinge members 22.

Figure 5:
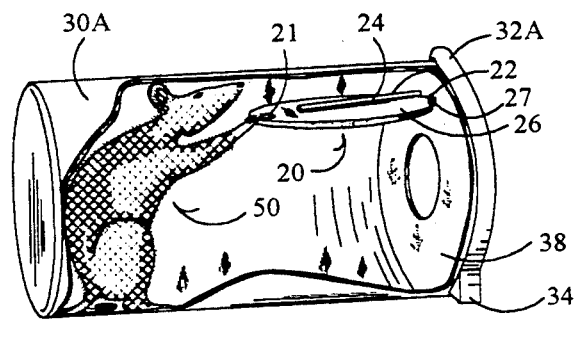
FIG. 5 is a partial sectioned, perspective, elevation view of the magnetic trap assembly in combination with a rodent and a cylindrical enclosure.

FIG. 5 shows an alternate embodiment where the air tight enclosure 30A is a metal cylinder. With any cylindrical enclosure 30A a bracket 34 is needed to keep the opened magnetic door 26 parallel to whatever surface it is resting on. This is necessary for proper operation of the gravity controlled magnetic door 26. The bracket 34 can be a separate part or formed into the cylindrical enclosure 30A or the round lid 32A.

FIG. 5 also shows the magnetic trap assembly without the magnetic door adapter. This is possible because the cylindrical enclosure 30A is made of a ferrous metal. The magnetic door 26 operates exactly the same except that it comes to rest against an inside flat surface 38 of the round lid 32A instead of the magnetic door adapter 28. But since the door 26 is magnetic and an inside flat surface 38 is magnetizable an air tight seal is still possible.

The enclosure's dimensions, whether cylindrical or rectangular, should be proportionally to the size of the animal being trapped. To set the trap the lid 32 should be connected to the enclosure 30 with the bait 21 in place on the magnetic door 26. All that is necessary at this point is to push the door 26 inward until it contacts the door support rod 24 where it will remain because of the magnetic attraction of the door 26 to the support rod 24. If an animal has been captured the door will be closed. Through testing it has been determined that an adult mouse in a properly sized enclosure will expire in approximately 30 minutes. The trap and mouse can be discarded, only the mouse can be discarded, or if the air holes have been opened the mouse can be released.

If the optional air holes are used the animal will remain alive indefinitely. It is possible that after a period of time the animal will try to gnaw its way out. The flexible magnetic material is vulnerable in this case and should the trap assembly 20 be used in this manner a piece of thin sheet metal should be placed on top of the magnetic door to protect it. This would only be necessary if the trap is not attended for an extended period.

SUMMARY, RAMIFICATIONS, AND SCOPE

The magnetic, air tight, animal trap assembly allows a variety of enclosures to be used as animal entrapment vehicles. It affords optional methods of dealing with the trapped animal. It is simple to use and economical to manufacture.

Although the description above contains many specifics they should not be construed as limiting the scope of the invention but merely providing illustrations of some of the presently preferred embodiments of this invention.

Thus the scope of the invention should be determined by the appended claims and their legal equivalents, rather than by the examples given.

The embodiments of this invention in which an exclusive property or privilege is claimed are defined as follows:

1. A magnetic, air tight, animal trap assembly in combination with an enclosure means comprising,
    a magnetic trap door assembly having a magnetic door, a magnetic door adapter, a hinge means, a bait means, an attachement means for attaching said magnetic trap door assembly to said enclosure means, and a door support rod; said enclosure means having an opening to permit entrance by an animal, said opening and said enclosure means sized to the animal being trapped; said magnetic door being flat with projections on its top edge surface to be received by said hinge means, said magnetic door sized to said magnetic door adapter, said magnetic door having said bait means attached thereto such that with the door open said bait means will be on its upper most surface in front of said door support rod, said magnetic door adapter being flat with an opening to permit entry by an animal and sized to the opening of the enclosure means; said magnetic door adapter having said hinge means and said door support rod attached such that when said magnetic door, having been received by said hinge means, and held open by magnetic attraction to the support rod, is dislodged by an animal and with the force of gravity said magnetic door will pivot from an open position to a closed position in contact with said magnetic door adapter, said magnetic door held open by its magnetic attraction to said door support rod and held closed by its magnetic attraction to said magnetic door adapter, said magnetic door and magnetic door adapter in a closed magnetized position overlapping one another in an air tight seal.

2. The magnetic trap door assembly of claim 1 wherein said bait means being an artificial substance impregnated with an animal attractant odor.

3. The magnetic trap door assembly of claim 1 wherein said enclosure means is air tight.

4. The magnetic trap door assembly of claim 3 wherein said enclosure means is plastic.

5. The magnetic trap door assembly of claim 4 wherein said attachment means being adhesive means.

6. The magnetic trap door assembly of claim 3 wherein said enclosure means is metal.

7. The magnetic trap door assembly of claim 6 wherein said magnetic door and said magnetic door adapter are composed of magnetized metal.

8. The magnetic trap door assembly of claim 6 wherein said magnetic door and said magnetic door adapter are composed of a flat, pliant, rubberized sheet of magnetic material.

9. The magnetic trap door assembly of claim 8 wherein said attachment means being magnetic attraction.

10. A magnetic air tight animal trap assembly in combination with a metal enclosure comprising,
    a magnetic trap door assembly having a magnetic door, a hinge means, a bait means and a door support rod, said metal enclosure having an opening to permit entrance by an animal, said opening sized to the animal being trapped and to said magnetic door such that an area of overlap is assured, and the area of overlap being large enough to maintain an air tight seal, said magnetic door having said bait means attached thereto such that with the door open the bait will be on its upper most surface in front of said door support rod, said magnetic door being flat with projections on its top edge surface to be received by said hinge means; said hinge means and said door support rod attached to an inside flat surface of said metal enclosure such that said magnetic door having been received by said hinge means will pivot downward from an open to a closed position; said magnetic door, because of gravity, will close and contact said inside flat surface of said metal enclosure as the door is dislodged from the support rod by an animal, said magnetic door held open by its magnetic attraction to said door support rod and held closed by its magnetic attraction to an inside flat surface of said metal enclosure, said magnetic door overlapping said inside flat surface such that an air tight seal is maintained.

11. The magnetic trap door assembly of claim 10 wherein said magnetic door is composed of a magnetized metal.

12. The magnetic trap door assembly of claim 10 wherein said magnetic door is composed of a flat, pliant, rubberized sheet of magnetic material.

13. A magnetic, air tight, animal trap assembly comprising,
    a magnetic trap door assembly having a magnetic door, a magnetic door adapter, a hinge means, a bait means, an attachment means for attaching said magnetic trap door assembly to an inside flat surface of an enclosure, and a door support rod; said magnetic door being flat with projections on its top edge surface to be received by said hinge means and sized to said magnetic door adapter; said magnetic door having said bait means attached such that with the door open said bait means will be on its upper most surface in front of said door support rod; said magnetic door adapter being flat with an opening to permit entry by an animal and sized to the animal being trapped, said magnetic door adapter having said hinge means and said door support rod attached thereto, such that said magnetic door having been received by said hinge means and held open by its magnetic attraction to said door support rod is dislodged by an animal and with the force of gravity said magnetic door will pivot from an open position, to a closed position in contact with said magnetic door adapter, said magnetic door held open by its magnetic attraction to said door support rod and held closed by its magnetic attraction to an inside flat surface of said magnetic door adapter, said magnetic door and magnetic door adapter in a closed magnetized position overlapping one another in an air tight seal.

14. The magnetic trap door assembly of claim 13 further including an air tight enclosure means with sealed air holes, whereby the air holes can be opened to permit a trapped animal to survive until released.

15. The magnetic trap door assembly of claim 14 wherein said enclosure means is plastic.

16. The magnetic trap door assembly of claim 15 wherein said attachment means of said magnetic trap door assembly to said enclosures means being adhesive means.

17. The magnetic trap door assembly of claim 14 wherein said enclosure means is metal.

18. The magnetic trap door assembly of claim 17 wherein said magnetic door and said magnetic door adapter are composed of magnetized metal.

19. The magnetic trap door assembly of claim 18 wherein said attachment means of said magnetic trap door assembly to said enclosures means being magnetic attraction.

20. The magnetic trap door assembly of claim 17 wherein said magnetic door and said magnetic door adapter are composed of a flat, pliant, rubberized sheet of magnetic material.

* * * * *